United States Patent [19]

Lewis et al.

[11] Patent Number: 5,441,758
[45] Date of Patent: Aug. 15, 1995

[54] PROCESS FOR PREPARING NO OR LOW FAT POTATO CHIPS AND STRAWS

[75] Inventors: Victor M. Lewis; David A. Lewis, both of Sydney, Australia

[73] Assignee: Byron Agricultural Company Pty. Ltd., Ruschcutters Bay, Australia

[21] Appl. No.: 121,997

[22] Filed: Sep. 14, 1993

Related U.S. Application Data

[62] Division of Ser. No. 872,070, Apr. 22, 1992, abandoned.

[30] Foreign Application Priority Data

Apr. 24, 1991 [AU] Australia ................ PK5810

[51] Int. Cl.6 .................................. A23L 1/217
[52] U.S. Cl. ................... 426/637; 426/464; 426/466; 426/808
[58] Field of Search ............... 426/637, 808, 456, 464, 426/466

[56] References Cited

U.S. PATENT DOCUMENTS

| | | |
|---|---|---|
| 2,705,679 | 4/1955 | Griffiths et al. |
| 3,338,724 | 8/1967 | Adler et al. |
| 3,586,512 | 6/1971 | Mancuso et al. |
| 3,634,095 | 1/1972 | Willard . |
| 3,650,776 | 3/1972 | Tschirgi . |
| 3,681,084 | 8/1972 | Rock et al. |
| 4,073,952 | 2/1978 | Standing et al. ............... 426/242 |
| 4,160,039 | 7/1979 | Schnell ............................ 426/60 |
| 4,283,525 | 8/1981 | Yuan et al. ..................... 426/102 |
| 4,503,127 | 3/1985 | Fan et al. .................... 426/637 X |
| 4,721,625 | 1/1988 | Lee et al. ........................ 426/438 |
| 4,756,916 | 7/1988 | Dreher et al. ................. 426/302 |
| 4,906,483 | 3/1990 | Kloos ............................. 426/243 |
| 4,919,965 | 4/1990 | Childers, Jr. .................. 426/615 |
| 5,118,518 | 6/1992 | Hattori et al. ............. 426/808 X |

FOREIGN PATENT DOCUMENTS

| | | |
|---|---|---|
| 2197533 | 3/1974 | France . |
| 62-048352 | 3/1987 | Japan . |

OTHER PUBLICATIONS

Putz, "Spezielle Problem Ebeider Chip", Die Starke Jan. 1975, pp. 12–16.
Talburt, *Potato Processing*, 1975, pp. 529–530.

*Primary Examiner*—Arthur L. Corbin
*Attorney, Agent, or Firm*—Scully, Scott, Murphy & Presser

[57] ABSTRACT

Potatoes are blanched, washed, treated with amylase, dehydrated, hydrated to 12% to 30%, tempered to a uniform moisture and toasted at 140° C. to 220° C. to about 2% moisture. The resulting product is flavored, salted and may have controlled amounts of oil, preferably between 3% and 7% by final weight, added during the process, preferably after toasting.

7 Claims, No Drawings

PROCESS FOR PREPARING NO OR LOW FAT POTATO CHIPS AND STRAWS

This is a request for filing a divisional application under 37 C.F.R. §1.60 of pending prior application Ser. No. 07/872,070, filed on Apr. 22, 1992 of Victor M. Lewis and David A. Lewis for Process for Preparing Fat Free Potato Chips and Straws, now abandoned.

BACKGROUND OF THE INVENTION

1. Field of the Invention

The present invention relates to a process for producing no fat or low fat potato products and the resulting products.

2. Description of the Prior Art

Potato chips are the most popular snack items in the Western world. Sales of potato chips in the United States alone in 1989 are estimated at $1,809 million.

Over the past decade, mounting evidence has been presented which points to the desirability of substantial fat reduction in the diet. To this end, manufacturers have been developing and marketing a range of products with reduced fat levels.

Potato chips are typically prepared by frying potato slices in hot oil until the aqueous moisture content of the slices is reduced to about 2% by weight or less. Fried potato chips prepared using conventional methods usually have an oil or fat content of from about 30% to about 45% by weight or more.

The high fat content puts potato chips near the top of the list in fat content among common snack foods. The high fat content is an undesirable factor to the future market leadership of this type of potato snack.

Considerable effort has been spent on the reduction of fat content in commercial potato chips. Several patents have been granted whereby a lower fat level in the chips can be attained. These, in general, result in products with a lower, but substantial fat content, which is still above 20%.

Lee, et al., U.S. Pat. No. 4,721,625, fries potatoes in oil to 10% to 25% by weight, removes surface oil and dries to 1.5% to 3% moisture.

Griffiths, et al., U.S. Pat. No. 2,705,679, discloses a fat free potato product in the form of hollow "pillows" formed by toasting fresh or blanched potato dices in a stream of hot (120° C. to 160° C.) air.

Adler, et al., U.S. Pat. No. 3,338,724, discloses a toasting method similar to U.S. Pat. No. 2,705,679 where potato is treated with salt and dried to 10% moisture at 310° F. to 390° F. to produce quick-cooking dehydrated potato pieces.

Tschirgi, U.S. Pat. No. 3,650,776, discloses a process of coating potatoes with a starch, pectin, protein and fiber coating and dehydrating to form rehydratable hash brown potatoes.

Potato based foods produced in accordance with these patents suffer from the shortcoming that they do not resemble in appearance, texture or flavor the potato chip to which consumers are accustomed.

Dreher, et al., U.S. Pat. No. 4,756,916, teaches preparation of low oil potato chips by washing the sliced potato, at least partially coating the slices with oil, blanching and then baking the blanched slices at a temperature of at least 200° C. to below the smoke point of the oil to dry the slices to a moisture content of 10 to 25 weight percent and then further baking the slices to 2% or less moisture using 145° C. to 160° C. temperature.

Childers, Jr., U.S. Pat. No. 4,919,965, teaches preparation of oil free potato slices by washing, peeling if desired, slicing, applying seasoning, tempering to absorb the seasoning and then toasting the chip using heated surfaces which keep the potato slice under pressure.

Kloos, U.S. Pat. No. 4,906,483, treats potatoes by cooking potato slices in water in a microwave, rinsing, browning and crispening in a radiant heat oven.

Standing, et al, U.S. Pat. No. 4,073,952, slices potatoes, blanches the slices in hot water containing a sulfur discoloration inhibitor, cools and rinses, and dries the slices for 20 to 120 minutes with microwave energy and heated moisture treated air to 4% to 12%. Optionally, the microwave power is reduced after the moisture content has been lowered to 20%.

Mancuso, et al., U.S. Pat. No. 3,586,512, teaches treating peeled, washed, sliced potatoes with a fat containing, color changing, breading mix and baking on a cookie sheet for 25 to 30 minutes at 425° F.

Mancuso, et al., U.S. Pat. No. 3,402,649, teaches soaking potato slices in oil at temperatures not exceeding the gelatinization temperature of potato starch and drying at 225° F. to 350° F. to brown.

Schnell, U.S. Pat. No. 4,160,039, teaches simulating deep fat fried food by coating the food with yeast, vegetable oil and water and baking in an oven.

Yuan, et al., U.S. Pat. No. 4,283,425, treats potato slices with protein, oil and microwave heating to a deep fried appearance.

Despite the numerous proposals for reducing the oil content of potato chips, no oil or low oil potato chips prepared using previously known processes often have one or more drawbacks that may include undesirable texture, flavor or color characteristics. Also, the previously known processes for preparing the low oil potato chips generally are not economically feasible for large scale commercial potato chip production. Accordingly, there remains a need in the art for an economical and efficient process for producing high quality no or low oil potato chips.

SUMMARY OF THE INVENTION

According to the invention, there is provided a process of producing a potato product having no added fat or a fat content which is added in a controlled way to any predetermined level which comprises dehydrating fresh potatoes or rehydrating sliced dehydrated potatoes to a moisture content of 12% to 30% in any conventional way and toasting the potato pieces at a temperature of 140° C. to 220° C. for approximately 30 seconds to three minutes.

The present invention has for its object an essentially fat free potato chip in conventional form, i.e., either a flat slice similar to a fat fried chip, or in shoestring form as potato straws.

An advantage of the invention is that there are already in existence substantial production facilities for the production of dehydrated potato slices or shoestring (julienne style) cuts. These are the starting material required to prepare the fat free potato chip.

DETAILED DESCRIPTION OF THE INVENTION

No or low fat potato chips or straws are prepared by a process which comprises slicing potatoes to form slices or straws, blanching the sliced potato, preferably treating the slices during or after blanching with a high temperature amylase enzyme to prevent later sticking together of slices during processing. The slices are next dehydrated to a moisture content of 12% to 30% by terminating the dehydrating process when the desired moisture is reached, or they are dried to less than 10% moisture and thereafter adjusted to 12% to 30% moisture with a water mist or spray. The 12% to 30% moisture chips are thereafter toasted to about 2% moisture at a temperature of 140° C. to 220° C. Flavorants, salt and oil can be added either before or after toasting.

The potatoes selected for processing may be any variety. A high solids potato is preferred and the potatoes should have a low reducing sugar level, preferably below 1%. Types of potatoes normally used for producing conventional fried chips are usually satisfactory.

While chips of any thickness may be used, preferably a slice thickness of about 2 mm to about 3 mm is most advantageous. With slices thicker than 3 mm, the product becomes progressively more hard, while under 2 mm, problems may be encountered in drying the potato slices due to excessive breakage on the dehydration belt or excessive sticking together of the slices during dehydration. Where slices are stuck together in layers, difficulties are encountered in toasting.

The sliced potatoes (either peeled or unpeeled) are blanched for a minimum of time to inactivate enzymes, and then thoroughly washed to remove surface starch. Excessive starch on the slices can result in slices sticking together in layers on the dehydration belt. This problem of adhesion during drying may be avoided by adding an amylase, preferably a high temperature amylase such as "Termamyl" (Novo Industries, Denmark) either to the blanch water or in the rinse water after hot water or steam blanching. The amylase continues to be effective in reducing cohesion during the dehydration process.

The potatoes are dried in the manner and in the type of equipment traditionally used for the dehydration of sliced potato products. The equipment most commonly used is a multistage belt dryer using a flow of hot air through the bed of cut potatoes. Air temperature in the early stages of drying is about 70° C. to 100° C. and drops to about 50° C. in the later stages of drying. This part of the process would be familiar to persons experienced in the art of potato dehydration.

During dehydration, the potato slices or shreds should be agitated as much as practical to reduce the tendency to stick together. This is the same in the conventional dehydration of potato slices.

Preferably, the potatoes should be dehydrated to about 9% moisture or lower. By dehydrating to this level, relatively uniform moisture is achieved throughout the mass of potatoes. Alternatively, it is possible to dehydrate the potatoes to a moisture level of about 16% to 20%, the level at which the potatoes are toasted, but it is generally difficult to achieve uniform moistures at this moisture content across an industrial dehydration belt.

The dehydrated potato pieces, if dried to 9% moisture or lower are shelf-stable and may be held in storage for a considerable time before toasting. At 16% to 20%, the pieces should not be stored longer than 24 hours unless the slices have been treated with sulfur dioxide. The use of sulfur dioxide is common practice in the potato dehydration industry.

The dehydrated potato, if not already at 16% to 20% moisture, is brought to that preferred level by misting or spraying with the appropriate amount of water and mixing well to get uniform moistening. This may be best achieved by rotating the slices or pieces in a revolving drum while spraying. While 16% to 20% is the preferred moisture level, a satisfactory product can be obtained using moisture levels between 12% and 30%. At the lower moisture contents, a more desired product is obtained after toasting while at the higher moisture contents the slices become progressively more flexible, are more difficult to handle satisfactorily and do not flow easily into the toaster. Salt, flavors and other additives may, if desired, be added to the water used for rehydration.

After adjusting the moisture content to 12% to 30%, either by dehydration to that moisture or by drying to a lower moisture and then hydrating, the slices are tempered for up to 12 hours, usually about four hours to allow the moisture to equilibrate and produce a uniform moisture content for toasting.

Toasting may be achieved by heating in hot air at temperatures between 140° C. to 220° C., preferably 160° C. to 200° C. Using lower temperatures a paler color is achieved, but toasting time is longer. The preferred toasting regime is about 180° C. for one minute, but this will have to be varied according to the nature of the potatoes, their reducing sugar content and other properties. After toasting, the chips should have a moisture content of less than 4%, preferably about 2%.

The potato chips may be flavored or salted prior to toasting, or flavors may be added during processing or after toasting and if desired, fats or oils may be sprayed, or otherwise added in a measured quantity to the chips before or after toasting. In this way, chips with a controlled fat content at any desired level may be produced.

As a result of this treatment, the potato slices are reduced to a very low moisture content, and are very crisp but are tender rather than hard.

The toasted chips have excellent potato flavor and an appearance closely resembling that of a traditional fat fried chip, are less fragile than a fat fried chip, have a long shelf-life and are not subject to fat rancidity in the manner of fat fried chips. They retain their crispness for a long time when removed from the packet.

In a preferred embodiment, the raw potato is sliced into chips of about 2 mm to about 3 mm in thickness which do not break or harden excessively when dehydrated. The chips are water or steam blanched and washed well with water to remove excessive starch. The chips are treated with a high temperature amylase enzyme at the later time of washing and the amylase enzyme remains effective during further processing to prevent chips from adhering to each other. The chips are next air dehydrated in conventional equipment to lower the moisture content to 9% or less. The dry product is next subjected to a water spray to adjust chip moisture to 12% to 30%, preferably 16% to 20% and preferably equilibrated for up to 12 hours, preferably about 4 hours to obtain a uniform moisture content. The moisture adjusted chips are next toasted by hot air or radiant heat or other known means to a moisture content below 4%, preferably about 2%. Toasting is achieved using an air temperature of 140° C. to 220° C. for from 10 seconds to 5 minutes, preferably an air temperature of 160° C. to 200° C. for 30 seconds to 3 minutes and more preferably about 180° C. for about 1 minute.

The toasted chips may then be salted and flavored. A small amount of oil may be added at any point in the process but preferably just after toasting. Oil at any level may be added preferably under 20%, more preferably at 3% to 7%. The oil or fat may contain flavoring materials, antioxidants, colorings or other additives. Apart from adding flavor, the oil or fat assists in the adhesion of salt, and powdered flavors to the product. If desired, no fat or oil need be added, thereby producing a fat free chip. Oil or fat may be added up to 3% and usually contained in additives or in the natural potato and such products may normally be labeled fat free.

In an alternative embodiment, the blanched and amylased chips are dehydrated to 12% to 30%, preferably 16% to 20% moisture using warm air. The chips are allowed to equilibrate, if necessary, and then toasted as previously described to about 2% moisture.

EXAMPLE 1

Potato slices of 2.5 mm thickness were washed, blanched in steam for two minutes, dipped in a "Termamyl - 120L" (Novo Industries, Denmark) 0.004% solution, drained, and dried in a hot air dryer to a moisture content of 9%. The dried slices were moistened by spraying with a fine water spray while tumbling in a rotary mixer until the moisture content was 18%. They were allowed to stand for four hours to achieve uniform moisture throughout the slice.

The slices at 18% moisture were fed at a uniform rate into a rotary toaster with a good airflow at 180° C. which gave good toasting in 60 seconds.

After cooling, the chips were sprayed with 5% of vegetable oil and then dusted with 1.5% fine salt to produce a tender potato chip.

EXAMPLE 2

Potatoes were cut into shreds 3×5 mm, washed and steam blanched for ½ minutes. After washing with water, they were dried in a hot air dryer to 9% moisture. They were adjusted to 16% moisture in the manner of Example 1, and toasted at 200° C. for 30 seconds. The toasted chips, on cooling were mixed with 7% of a cheese flavored powder to give a tender, flavored potato straw.

EXAMPLE 3

Potato slices prepared and dehydrated as in Example 1 were rehydrated with salted water to give a salted slice containing 2% of salt and 20% moisture. This was toasted for 90 seconds at 170° C. to give a fat free potato chip.

What is claimed:

1. A process for preparing no or low fat potato chips or straws comprising:
   slicing raw potato to form slices having thicknesses of about 2 mm to about 3 mm which will not break or become excessively hard on subsequent dehydration;
   blanching and washing the potato slices to remove excessive starch;
   dehydrating the blanched potato slices in hot air to a moisture content of 12% to 30%; and
   toasting the dehydrated slices at 140° C. to 220° C. to a moisture content below 4%.

2. The process of claim 1 which further includes treating the potato slices after blanching and washing but prior to dehydrating with an effective amount of amylase to prevent subsequent sticking of the slices during processing.

3. The process of claim 1 wherein the dehydrating includes reducing the moisture content of the blanched chip to 9% or lower and thereafter rehydrating the chip to 12% to 30% moisture prior to toasting.

4. The process of claim 1 wherein the dried chips are tempered for up to 12 hours prior to toasting.

5. The process of claim 1 wherein up to 20% fat is added after toasting.

6. A process for preparing no or low fat potato chips comprising:
   slicing raw potatoes to about 2 mm to about 3 mm in thickness;
   blanching the potato slices to inactivate surface enzymes;
   washing the blanched slices to remove starch;
   treating the washed slices with an amylase effective to reduce slice sticking during subsequent processing;
   dehydrating the slices to a moisture content of 9% or less;
   hydrating the dehydrated slices to 121% to 30% moisture with water;
   tempering the hydrated slices to equilibrate the moisture content of the slices;
   toasting the tempered slices at 140° C. to 220° C. to a moisture content of about 2%; and
   thereafter adding up to 20% fat to the toasted slices when desired.

7. The process of claim 6 wherein the slices are hydrated to 16% to 20% moisture and toasted at about 180° C. for about 1 minute.

* * * * *

UNITED STATES PATENT AND TRADEMARK OFFICE
CERTIFICATE OF CORRECTION

PATENT NO. : 5,441,758
DATED : August 15, 1995
INVENTOR(S) : Victor M. Lewis, et al.

It is certified that error appears in the above-indentified patent and that said Letters Patent is hereby corrected as shown below:

Column 3, line 67: "to-that" should read --to that--

Column 5, line 48: "saltand" should read --salt and--

Column 6, line 39, Claim 6, "121%" should read --12%--

Signed and Sealed this

Twenty-seventh Day of February, 1996

*Attest:*

BRUCE LEHMAN

*Attesting Officer*     *Commissioner of Patents and Trademarks*